United States Patent [19]

Karabin

[11] Patent Number: 5,695,116
[45] Date of Patent: Dec. 9, 1997

[54] THERMALLY ACTIVATED VENT DAMPER

[75] Inventor: Tadeusz Karabin, Bellingham, Wash.

[73] Assignee: The Majestic Products Company, Huntington, Ind.

[21] Appl. No.: 389,271

[22] Filed: Feb. 8, 1995

[51] Int. Cl.[6] .................................................. G05D 23/08
[52] U.S. Cl. ..................... 236/1 G; 236/93 R; 236/101 D
[58] Field of Search .......................... 236/1 G, 93 R, 236/101 D; 137/512.1; 251/303

[56] References Cited

U.S. PATENT DOCUMENTS

| | | | |
|---|---|---|---|
| 2,368,149 | 1/1945 | Lee | 251/303 |
| 2,864,401 | 12/1958 | Carr | 251/303 |
| 2,975,975 | 3/1961 | Weber . | |
| 3,273,798 | 9/1966 | Kuiper . | |
| 3,366,333 | 1/1968 | Diehl . | |
| 3,696,804 | 10/1972 | Paredes . | |
| 3,926,216 | 12/1975 | Ruicker | 251/303 |
| 4,114,805 | 9/1978 | Humphreys . | |
| 4,236,668 | 12/1980 | Prikkel . | |
| 4,254,759 | 3/1981 | Schmidt . | |
| 4,272,013 | 6/1981 | Diermayer . | |
| 4,283,006 | 8/1981 | Fedewitz . | |
| 4,294,401 | 10/1981 | Diermayer . | |
| 4,337,892 | 7/1982 | Diermayer . | |
| 4,355,567 | 10/1982 | Josephson . | |
| 4,361,272 | 11/1982 | Prikkel . | |
| 4,372,485 | 2/1983 | McCabe . | |
| 4,384,671 | 5/1983 | Hayes . | |
| 4,386,731 | 6/1983 | Barth . | |
| 4,441,653 | 4/1984 | Grudich . | |
| 4,460,121 | 7/1984 | Hedrick . | |
| 4,587,706 | 5/1986 | Prikkel . | |
| 5,101,853 | 4/1992 | Mailliet et al. | 251/303 |
| 5,186,385 | 2/1993 | Karabin . | |

FOREIGN PATENT DOCUMENTS

| | | |
|---|---|---|
| 209039 | 5/1960 | Germany . |
| 1139625 | 11/1962 | Germany . |
| 27 05 398 | 8/1978 | Germany . |
| 29 19 377 | 11/1980 | Germany . |

*Primary Examiner*—William T. Tapolcai
*Attorney, Agent, or Firm*—Baker & Daniels

[57] ABSTRACT

A thermally activated vent damper assembly for occluding passage of gases in a passageway such as a flue. The assembly includes first and second damper members which are pivotable about a common axis. Coaxial first and second support members which are spaced apart along the common axis support thermally activated biasing members which are attached to the damper members to thereby suspend the damper members within the flue. When heated, the biasing members pivot the first and second damper members about their common axis from a flue closing orientation to a flue opening orientation. The assembly may include a housing mountable to the flue and to which the first and second support members are attached.

2 Claims, 2 Drawing Sheets

THERMALLY ACTIVATED VENT DAMPER

BACKGROUND OF THE INVENTION

The present invention relates to vent dampers for heating apparatuses such as fireplaces, wood stoves, water heaters and gas-fired furnaces, and, in particular, to thermally activated vent dampers which automatically open and close in the presence or absence of heat.

A variety of different types of vent dampers are known which are automatically activated by the presence or absence of heat. For example, U.S. Pat. No. 5,186,385 discloses a vent damper that includes thermally activated biasing springs, mounted on a diametrically disposed support member, which pivot a pair of damper blades to an open orientation upon being heated.

One problem with this design in certain installations is that the same heat energy which activates the vent damper may interfere with the operation of the damper. In particular, the high heat energy experienced over the course of operation typically causes appreciable expansion of the elongate support member. When the support member is rigidly attached, such as by welding, to a sleeve telescopically within a flue pipe in an operational position, the bowing of the support member resulting from expansion may stress and break the welded connections, thereby possibly making the unit inoperational. In situations of tight design tolerances, this bowing may also hinder the pivotal motion of the damper blades, thereby compromising the effectiveness of the damper.

Another problem compounded by the elongate support member of this design pertains to undesirable vibration noises. During use, especially when the damper blades are nearly closed and collide with provided stops due to drafts through the flue, one, or possibly both, of the damper blades may experience vibrational motion. Because of its interconnection with the blades via the biasing springs, the support member may consequently begin to vibrate along its length, and may also cause the other damper blade to vibrate. The noise created by these vibrations is an annoyance which detracts from the desirability of the damper.

Thus, it is desirable to provide a support for the damper blades of a thermally activated vent damper which may reduce problems associated with heat expansion and which may reduce vibrational noise.

SUMMARY OF THE INVENTION

The present invention provides a vent damper assembly which utilizes relatively short, separate support members, rather than a single support member extending the width of the flue, to support thermally activated biasing members which in turn suspend damper plates within a flue. The use of these separate support members achieves a vent damper assembly which mitigates problems caused by thermal expansion of component parts and which helps reduce vibrational noise problems. In one form thereof, the present invention provides a thermally activated vent damper assembly for a flue which includes at least one damper member adapted to be situated in relation to the flue for occluding the passage of gas through the flue, and first and second damper support members coaxially aligned along an axis of damper member pivotal rotation and in axially spaced apart relationship. The first and second damper support members are adapted to suspend the at least one damper member across the flue. The assembly also includes a first thermally activated biasing member operatively secured between the at least one damper member and the first damper support member to suspend the at least one damper member from the first support member, and a second thermally activated biasing member operatively secured between the at least one damper member and the second damper support member to suspend the at least one damper member from the second support member. The first and second thermally activated biasing members bias the at least one damper member about the axis of pivotal rotation to a flue closing orientation in the absence of heat and a flue opening orientation in the presence of heat.

In another form thereof, the present invention provides a thermally activated vent damper assembly for a flue which includes a first damper member adapted to be situated in relation to the flue for occluding the passage of gas through the flue, wherein the first damper member is pivotable about a first axis between a flue closing orientation and a flue opening orientation, a second damper member adapted to be situated in relation to the flue for occluding the passage of gas through the flue, wherein the second damper member is pivotable about the first axis between a flue closing orientation and a flue opening orientation, a first support member aligned along the first axis, a second support member aligned along the first axis and in axial spaced apart relationship with the first support member, first and second thermally activated biasing members secured to the first damper member and secured to the first support member and the second support member respectively, and third and fourth thermally activated biasing members secured to the second damper member and secured to the first support member and the second support member respectively. The first and second thermally activated biasing members bias the first damper member about the first axis to the flue closing orientation in the absence of heat and to the flue opening orientation in the presence of heat, and the third and fourth thermally activated biasing members bias the second damper member about the first axis to the flue closing orientation in the absence of heat and to the flue opening orientation in the presence of heat. The assembly may also include a housing mountable to the flue and to which the first and second support members are attached.

One advantage of the vent damper of the present invention is that expansion of the damper blade support components caused by the heat energy used to activate the vent damper does not impair or destroy the damper operation. Another advantage of the present invention is that it reduces noises resulting from possible vibrations of the damper blades.

BRIEF DESCRIPTION OF THE DRAWINGS

The above mentioned and other advantages and objects of this invention, and the manner of attaining them, will become more apparent and the invention itself will be better understood by reference to the following description of an embodiment of the invention taken in conjunction with the accompanying drawings, wherein.

DESCRIPTION OF THE PREFERRED EMBODIMENT

The embodiment disclosed below is not intended to be exhaustive or limit the invention to the precise form disclosed in the following detailed description. Rather, the embodiment is chosen and described so that others skilled in the art may understand its teachings.

Figure 1:
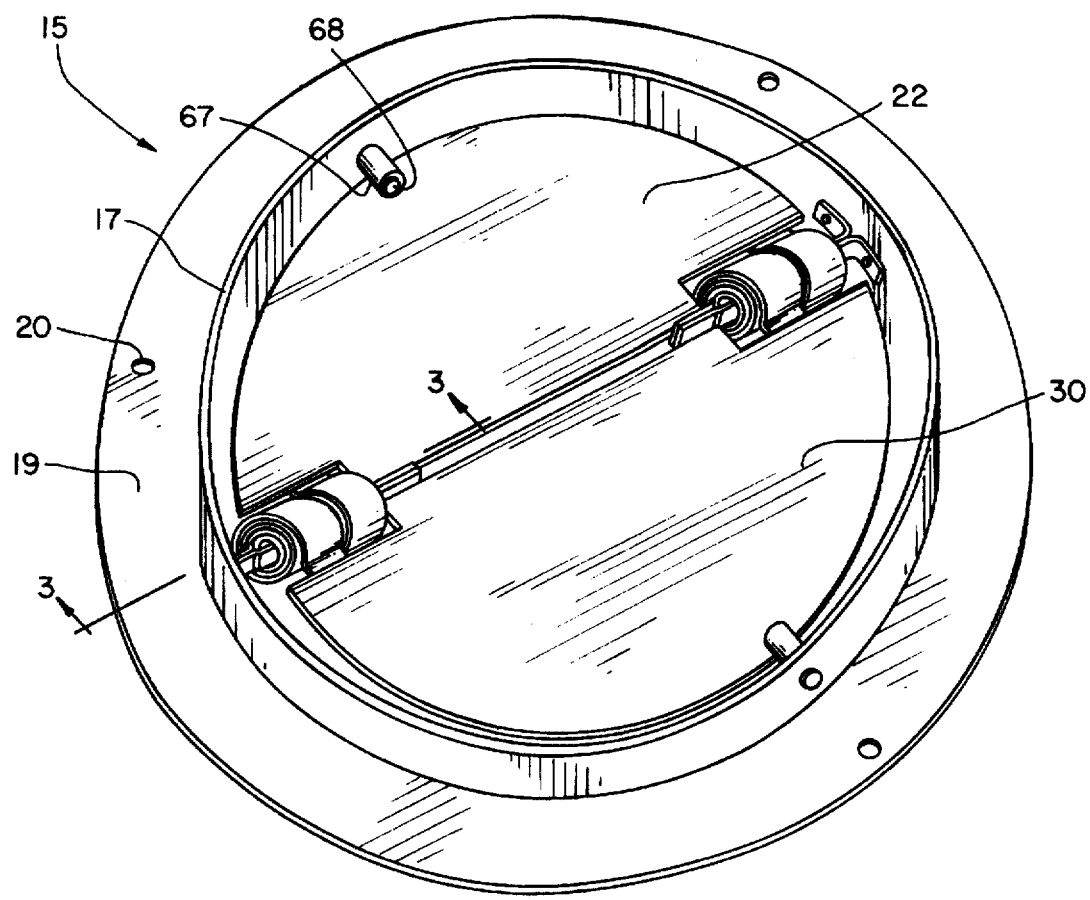
FIG. 1 is a top perspective view of the thermally activated vent damper of the present invention.
Figure 2:
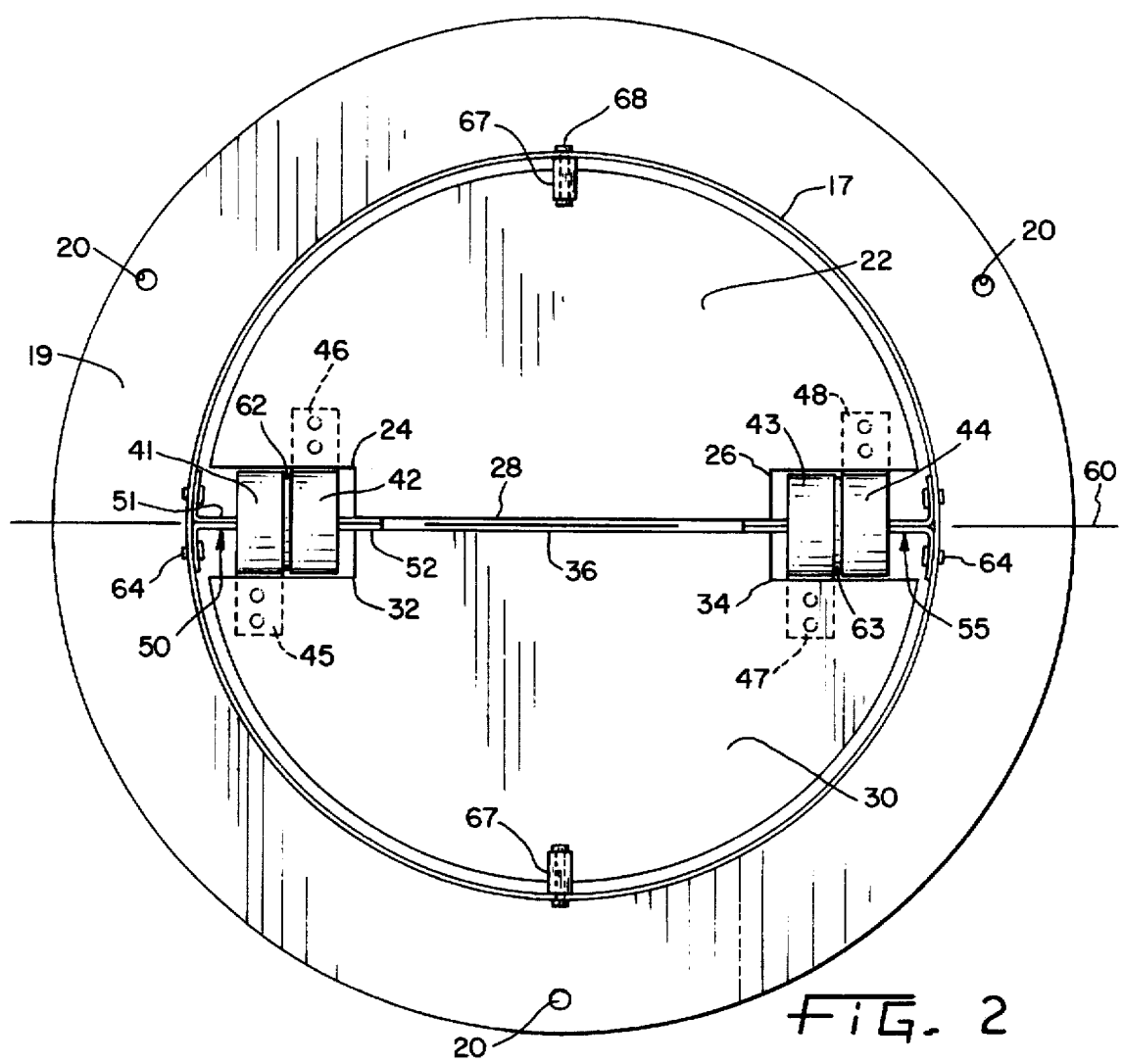
FIG. 2 is a top view of the thermally activated vent damper of FIG. 1 when the damper blades are disposed in a closed or flue occluding orientation.
Figure 4:
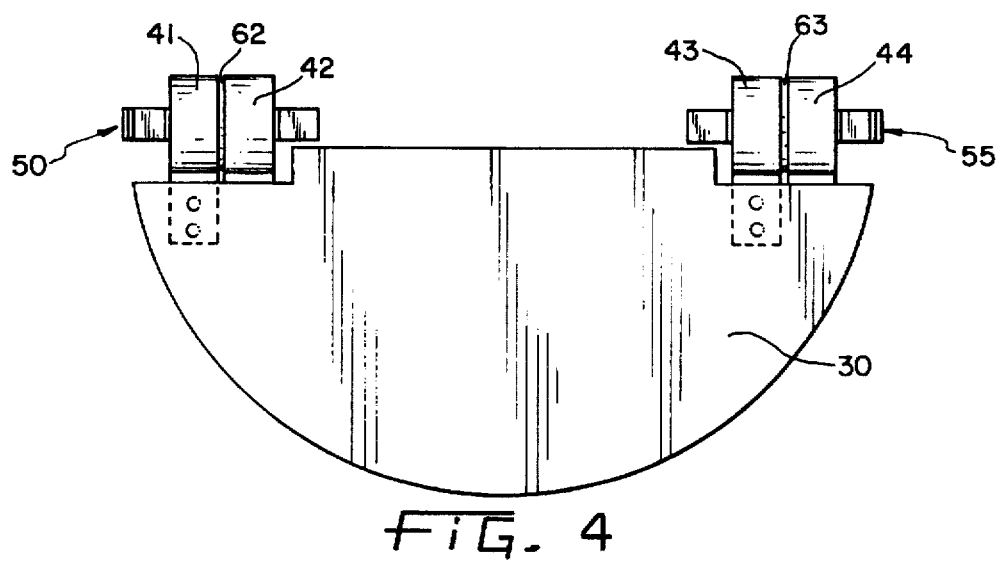
FIG. 4 is a partial side view of the thermally activated vent damper of FIG. 1 with its housing removed and when the damper blades are disposed in an open orientation.

Referring now to FIGS. 1 and 2, there are respectively shown a top perspective view and a top view of a thermally activated vent damper of the present invention, generally designated 15. Vent damper 15 is similar in many respect to the damper disclosed in U.S. Pat. No. 5,186,385, assigned to the assignee of the present invention, the disclosure of which is explicitly incorporated herein by reference. In the shown embodiment, which is preferably utilized in conjunction with a cylindrical flue stack 21 or the like in which it is telescopically received, vent damper 15 includes an external housing 17 which is a cylindrical sleeve in shape and which recesses and thereby better protects the biasing members described further below. Housing 17 is provided with an orthogonally projecting annular mounting collar or flange 19. Fasteners can be inserted through apertures 20 in collar 19 to install vent damper 15, for instance at the inlet of flue stack 21, at a location allowing regulation of the passage of gas through the stack passageway. Collar 19 also provides vent damper 15 with the flexibility to be used to regulate the flow of gases through a variety of differently sized. and shaped passageways. For example, collar 19 blocks the flow path of gases through flue stack 21 should housing 17 and the dynamic components of vent damper 15 which it rings be of a smaller size or diameter than the flue stack 21 being regulated. Housing 17 and collar 19 naturally also may be otherwise shaped and sized to conform to any of a variety of specified dimensions.

A pair of damper blades or plates 22, 30 are positioned within housing 17 in a generally coplanar relationship when closed. Damper blades 22, 30 are preferably mirror images, which both provides better weight distribution as well as facilitates manufacture or assembly. In the shown embodiment, damper blades 22, 30 are substantially semi-circular in shape to conform to the shape of housing 17, thereby significantly blocking the passage of gases when disposed in the closed orientation shown. Damper blade 22 includes rectangular notches 24, 26 formed along inner edge 28, and damper blade 30 similarly includes notches 32, 34 along edge 36, shaped and sized to accommodate the biasing members 41–44 used to pivot damper blades 22, 30 between opened and closed orientations.

As shown in FIGS. 1–4, thermally activated biasing members 41–44 are preferably bimetallic coiled springs well known in the art. Other bimetallic spring type devices, such as helical coils, could also be substituted for the illustrated coils within the scope of the invention. Preferably two biasing members, positioned proximate opposite damper blade ends, are employed for biasing each damper blade 22, 30. As shown in shadow in FIG. 2, the outermost or uncoiled ends 45, 47 of biasing coils 41, 43 are directly secured to damper blade 30, and the outermost or uncoiled ends 46, 48 of biasing coils 42, 44 are directly secured to damper blade 22, to effect operation of vent damper 15 dependent on the experienced environmental conditions. Securement is preferably achieved via spot welding or alternatively by other methods known in the art.

Biasing members 41–44 are concentrically arranged on a pair of separate horizontal support members 50, 55 that project inwardly from the inner radial periphery of housing 17 at a position between damper blades 22, 30. Support members 50, 55 cooperate with biasing members 41–44 to effectively suspend damper blades 22, 30 internally of housing 17 and across the gas flow passageway. As shown in FIG. 2, support members 50, 55 are coaxially arranged in spaced apart arrangement along an axis 60 about which damper blades 22, 30 pivotally move during damper opening and closing. As damper blades 22, 30 are mirror images in this embodiment, it will be appreciated that axis 60 diametrically extends through housing 17, and therefore support members 50, 55 extend radially inwardly.

Figure 3:
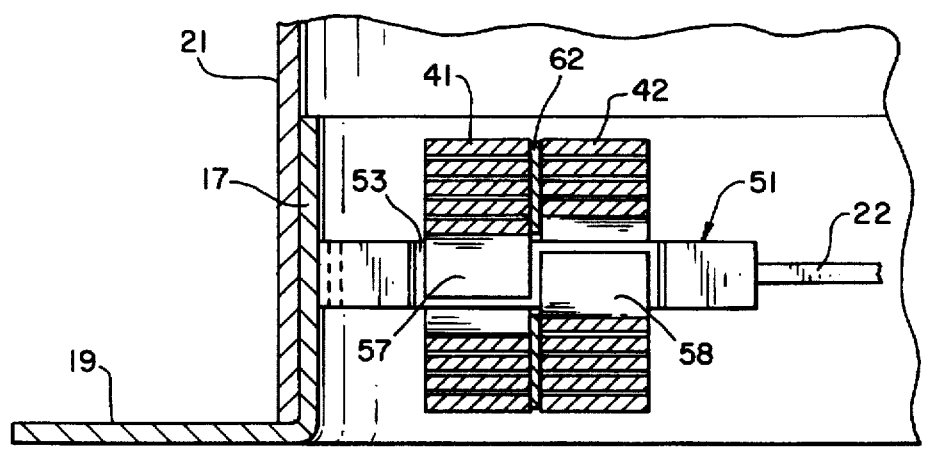
FIG. 3 is a partial cross-sectional view, taken along line 3—3 of FIG. 1, better illustrating the damper support member and its associated thermally activated biasing members.

With reference to FIGS. 2 and 3, the preferred construction of support member 50 will be further explained. Support member 55 is similarly constructed to support member 50, and therefore the following explanation has equal applicability to support member 55. Support member 50 utilizes a pair of generally L-shaped mirror image brackets 51, 52 made of stainless steel or aluminized metal. The longer leg of each bracket 51, 52 includes a central segment 53 which is offset outward, i.e. away from its opposing bracket 51, 52, for purposes of providing a recess utilized in the securement of biasing members 41, 42. During support member 50 manufacture, the relatively flat innermost ends 57, 58 of biasing members 41, 42 are aligned within the recess of central segments 53 and with an anti-vibration steel washer 62 axially disposed therebetween. When brackets 51, 52 are then secured together, preferably by spot welding provided along the longer bracket legs on both axial sides of central segments 53, innermost ends 57, 58 are tightly sandwiched therebetween and frictionally secured. As a result, biasing members 41, 42 are rigidly secured to support member 50. The thickness of annular washer 62 is selected in conjunction with the axial length of offset 53 such that washer 62 is gently axially compressed between secured biasing members 41, 42 to frictionally contact and thereby damp undesirable vibrations within biasing members 41, 42. It will be appreciated that washer 63 is similarly inserted between biasing members 43, 44 on support member 55. Support members 50, 55 are ultimately rigidly secured to housing 17, such as by rivets 64 passing through the lower legs of brackets 51, 52.

It will be appreciated that vent damper 15 could also be installed without housing 17 by fixedly securing support members 50, 55 directly to the interior of the flue stack 21. However, the greater serviceability of the unit provided by housing 17 and its associated collar 19 is preferred.

Referring to FIGS. 1 and 2, attached to housing 17 are a pair of stop members which prevent pivoting of damper blades 22, 30 beyond the fully closed or horizontal position when bimetallic elements 41–44 are not heated. In the shown embodiment, each stop member is formed of a cylindrical sleeve 67 through which a fastener such as rivet 68 passes and attaches to housing 17.

The structure of vent damper 15 will be further understood in view of the following explanation of its operation in conjunction with flue stack 21. When operationally installed, and with damper blades 22, 30 in a closed orientation shown in FIGS. 1 and 2 due to the absence of sufficient heat energy to activate biasing members 41–44, vent damper 15 occludes flue stack 21. As heat from a combustion chamber or the like contacts biasing members 41–44, the biasing members undergo movement as a result of the thermal expansion properties of the metals from which they are fabricated. During this movement, biasing members 41, 43 and 42, 44 begin to respectively pivot damper blades 30, 22 downward toward the combustion chamber about support members 50, 55 aligned on axis 60. During this pivoting, damper blades 22, 30 move to the open orientation shown in side view in FIG. 4. As a result of the heat energy experienced, support shafts 50, 55, as well as damper blades 22, 30, typically experience some longitudinal or axial expansion causing elongation in the horizontal plane. Biasing members 41–44 account for this relative movement between shafts 50, 55 and blades 22, 30 by slightly laterally shifting or uncoiling along their coil axis, which is coaxial with axis 60.

When sufficient heat energy is no longer provided to or otherwise experienced by vent damper 15, biasing members 41–44 contract and consequently pivot damper blades 22, 30 upward toward a closed orientation. Damper blades 22, 30 continue to be pivoted until they contact and are biased against stop member sleeves 67. It will be appreciated that the stop members prevent biasing members 41–44 from moving damper blades 22, 30 upwardly beyond a flue occluding orientation. During closing, if damper blades 22 or 30 bounce against stop member sleeves 67 perhaps due to a draft within flue stack 21, vibration of damper blades 22, 30 is dampened by anti-vibration washers 62, 63. In particular, the initial vibration of blades 22, 30 is transferred to the outer coils of biasing members 41–44. The surfaces of washers 62, 63 abut and frictionally engage the biasing coils to dampen or limit the vibrational movement of biasing members 41–44, but naturally are not so restrictive as to interfere with the pivoting of damper blades 22, 30 during operation. If biasing members 41–44 yield over the course of their operation, it will be appreciated that damper blades 22, 30 will rotate downward under the force of gravity to an open orientation such that vent damper 15 fails in a safe manner.

While this invention has been described as having a preferred design, the present invention may be further modified within the spirit and scope of this disclosure. This application is therefore intended to cover these and any other variations, uses, or adaptations of the invention using its general principles. Further, this application is intended to cover such departures from the present disclosure as come within known or customary practice in the art to which this invention pertains.

What is claimed is:

1. A thermally activated vent damper assembly for a flue comprising:

at least one damper member adapted to be situated in relation to the flue for occluding the passage of gas through the flue, said at least one damper member comprising a first damper blade and a second damper blade;

first and second damper support members coaxially aligned along an axis of damper member pivotal rotation and in axially spaced-apart relationship, said first and second damper support members adapted to suspend said at least one damper member across the flue;

a first thermally activated biasing member operatively secured between said at least one damper member and said first damper support member to suspend said at least one damper member from said first support member, said first thermally activated biasing member comprising a first biasing element connected to said first damper blade and a second biasing element connected to said second damper blade;

a second thermally activated biasing member operatively secured between said at least one damper member and said second damper support member to suspend said at least one damper member from said second support member, said second thermally activated biasing member comprising a third biasing element connected to said first damper blade and a fourth biasing element connected to said first damper blade and a fourth biasing element connected to said second damper blade; and a vibration dampener disposed between and frictionally engaging said first and second biasing elements;

wherein said first and second thermally activated biasing members bias said at least one damper member about said axis of pivotal rotation to a flue closing orientation in the absence of heat and a flue opening orientation in the presence of heat.

2. A thermally activated vent damper assembly for a flue comprising:

a first damper member adapted to be situated in relation to the flue for occluding the passage of gas through the flue, said first damper member pivotable about a first axis between a flue closing orientation and a flue opening orientation;

a second damper member adapted to be situated in relation to the flue for occluding the passage of gas through the flue, said second damper member pivotable about said first axis between a flue closing orientation and a flue opening orientation;

a first support member aligned along said first axis;

a second support member aligned along said first axis and in axially spaced-apart relationship with said first support member;

first and second thermally activated biasing members secured to said first damper member and secured to said first support member and said second support member respectively;

third and fourth thermally activated biasing members secured to said second damper member and secured to said first support member and said second support member respectively;

wherein said first and second thermally activated biasing members bias said first damper member about said first axis to said flue closing orientation in the absence of heat and to set flue opening orientation in the presence of heat;

wherein said third and fourth thermally activated biasing members bias said second damper member about said first axis to said flue closing orientation in the absence of heat and to said flue opening orientation in the presence of heat;

a housing mountable to the flue and to which said first and second support members are attached; and a vibration dampener disposed between and frictionally engaging said first and third thermally activated biasing members.

* * * * *